UNITED STATES PATENT OFFICE.

AMOS M. BAILEY, OF MARLBOROUGH, OHIO.

METHOD OF PRESERVING EGGS.

SPECIFICATION forming part of Letters Patent No. 247,528, dated September 27, 1881.

Application filed March 25, 1881. (No specimens.)

*To all whom it may concern:*

Be it known that I, AMOS M. BAILEY, of Marlborough, in the county of Stark and State of Ohio, have invented certain new and useful Improvements in Processes of Preserving Eggs; and I do hereby declare the following to be a full, clear, and exact description of the invention, such as will enable others skilled in the art to which it pertains to make and use it.

My invention relates to an improved process for the preservation of eggs; and it consists in the manner of packing hereinafter described and claimed.

My process is as follows: The eggs are heated to a temperature of about 100° Fahrenheit. A dry substance, such as bran, sawdust, or the like, is also heated to the same temperature. The eggs are then packed in the dry substance in a tin can adapted to be hermetically sealed. After being so packed the container is closed and sealed. The can is now placed in a bath heated to a temperature of 212° Fahrenheit, and there held for about ten minutes, when the can is punctured to permit the escape of air. The vent is then closed.

Eggs packed in this manner will keep for months, and being packed in a dry substance the bath at 212° Fahrenheit will not cook them, as would be supposed.

I do not limit myself to the use of a tin can, as any vessel that is capable of being hermetically sealed and vented, as described, will answer as well.

What I claim is—

The process herein described for the preservation of eggs, consisting of the following steps: first, heating the eggs and the substance in which they are to be packed to a blood heat; second, packing the eggs in the substance in a close container; third, hermetically sealing the container; fourth, immersing the container, with its contents, in a hot bath; fifth, venting the container; sixth, closing the vent, substantially as and for the purposes described.

In testimony whereof I have signed my name to this specification in the presence of two subscribing witnesses.

AMOS MONTROULLE BAILEY.

Witnesses:
J. A. PUTT,
E. F. MARTIN.